United States Patent
Sawicki et al.

(10) Patent No.: US 9,717,220 B2
(45) Date of Patent: Aug. 1, 2017

(54) AQUARIUM FILTER WITH WATER STREAM DIVERSION SYSTEM AND METHOD OF USE THEREOF

(71) Applicant: EUGENE G. DANNER MANUFCTURING INC., Islandia, NY (US)

(72) Inventors: Steven R. Sawicki, Stonybrook, NY (US); Gerald A. Phillips, Wantagh, NY (US)

(73) Assignee: EUGENE G. DANNER MANUFACTURING, INC., Islandia, NY (US)

( * ) Notice: Subject to any disclaimer, the term of this patent is extended or adjusted under 35 U.S.C. 154(b) by 42 days.

(21) Appl. No.: 14/805,029

(22) Filed: Jul. 21, 2015

(65) Prior Publication Data
US 2016/0235043 A1 Aug. 18, 2016

Related U.S. Application Data

(60) Provisional application No. 62/117,556, filed on Feb. 18, 2015.

(51) Int. Cl.
*A01K 63/04* (2006.01)
*C02F 1/00* (2006.01)
*C02F 103/20* (2006.01)

(52) U.S. Cl.
CPC .......... *A01K 63/045* (2013.01); *A01K 63/047* (2013.01); *C02F 1/001* (2013.01); *C02F 2103/20* (2013.01); *C02F 2201/004* (2013.01)

(58) Field of Classification Search
CPC ..... A01K 63/045; A01K 63/047; C02F 1/001; C02F 2103/20; C02F 2201/004
USPC .......................... 210/167.23, 416.2; 119/259
See application file for complete search history.

(56) References Cited

U.S. PATENT DOCUMENTS

| | | | |
|---|---|---|---|
| 2,899,063 A | 8/1959 | Ellis, Jr. | |
| 3,874,340 A | 4/1975 | Lemond et al. | |
| 4,220,530 A | 9/1980 | Gabriele | |
| 4,379,050 A | 4/1983 | Hess et al. | |
| 4,842,726 A | 6/1989 | Willinger | |
| 4,997,559 A | 3/1991 | Ellis et al. | |
| 5,098,585 A | 3/1992 | Woltman et al. | |
| 5,695,654 A * | 12/1997 | Schultz | A01K 63/006 119/264 |
| 5,791,285 A | 8/1998 | Johnson | |
| 6,202,677 B1 | 3/2001 | Chen et al. | |

(Continued)

*Primary Examiner* — Fred Prince
(74) *Attorney, Agent, or Firm* — Galgano IP Law PLLC; Thomas M. Galgano; Jessica G. McDonald

(57) ABSTRACT

An aquarium filter with water stream diversion system and method of use thereof, having an intake, an outlet, and a pump to draw water into the intake and discharge water from the outlet. The system further includes a water stream diversion conduit having a first open end, an opposite second open end, and a fluid channel between the first and second open ends. The first open end of the conduit can releasably connect to the intake of the pump or the outlet of the pump. When the conduit is connected to the outlet of the pump, the water is diverted from the outlet of the pump into the conduit, for discharge from the conduit. When the conduit is connected to the intake of the pump, water is drawn into the conduit and discharged from the conduit into the intake of the pump.

22 Claims, 10 Drawing Sheets

(56) References Cited

U.S. PATENT DOCUMENTS

| | | | |
|---|---|---|---|
| 6,444,120 B1 * | 9/2002 | Morgan | A01K 61/003 119/259 |
| 6,533,928 B1 | 3/2003 | Terato | |
| 6,823,537 B1 | 11/2004 | Cummings, III | |
| 7,022,227 B1 | 4/2006 | Liao | |
| 8,347,820 B2 | 1/2013 | Sigmon et al. | |
| 2007/0068857 A1 | 3/2007 | Davison | |
| 2007/0068858 A1 | 3/2007 | Davison | |

* cited by examiner

AQUARIUM FILTER WITH WATER STREAM DIVERSION SYSTEM AND METHOD OF USE THEREOF

CROSS-REFERENCE TO RELATED APPLICATION

This application claims benefit from U.S. Provisional Patent Application Ser. No. 62/117,556, filed Feb. 18, 2015, the contents of which are hereby incorporated by reference.

BACKGROUND OF THE INVENTION

Field of the Invention

The present invention is generally in the field of household aquarium maintenance. More particularly, the present invention is an aquarium filter with water stream diversion system which allows the filter to assume various configurations which provide for multiple modes of operation and methods of use thereof. Specifically, the aquarium filter with water stream diversion system of the present invention can be reconfigured to be used as a remote filter intake, a remote filter outlet, to drain water from the aquarium, to replenish water in the aquarium, and/or in conjunction with an aquarium gravel cleaning device.

Brief Description of the Prior Art

It is commonly known that aquariums require appliances for filtering the water contained therein as well as periodic partial water changes to maintain a healthy environment within the aquarium. Filters of various configurations are known to clean and filter the water within the aquarium, and which use an integral pump to force water through various filtration media including mechanical filtration, biological filtration, chemical filtration, as well as ultraviolet exposure treatment. Aquarium filter devices currently known have various arrangements and configurations that provide traditional filtration. Two popular filtration arrangements are hang-on external aquarium filters and internal aquarium filters.

For changing the water within an aquarium, there are a variety of consumer products currently available. A basic hose and bucket provide a method to manually remove water from the aquarium for discarding and subsequent refilling the aquarium with fresh water. A bucket can also be utilized to replenish the water drained from the aquarium. However, disadvantageously, this can disrupt the aquarium environment by manually pouring water into the aquarium. Alternatively, manual siphons, separate pumps, hoses and automatic water exchange devices are available for water changing. However, disadvantageously, these products require extra equipment to be purchased, set-up for use, and then stored after changing the water in the aquarium.

Gravel cleaning has also been a regular maintenance requirement that has been performed using a variety of specialized gravel cleaning equipment. These include siphon cleaners, battery powered motors, air venturi powered suction tube cleaners, and rim-mounted motor powered filter enclosures. All gravel cleaners use a rigid tube that can be positioned to reach the bottom of the aquarium where it is inserted and moved about in the gravel bed to dislodge and remove the particulate debris from the gravel. In typical siphon cleaner models, the debris is drawn into the tube and immediately directed into a drain or container outside the aquarium. In motor powered and air powered gravel cleaning devices, the contaminated water is forced through filter material and returned to the aquarium.

Siphon cleaning devices may include mechanical means to get the siphon started such as a built in check valve or squeeze bulb valve that creates the suction and maintains the one-way water flow for as long as the siphon is intact. Powered gravel cleaners of the hand-held variety use a top mounted small battery powered motor to create instant suction that is transferred to the bottom end of the tube at the gravel bed. Air powered gravel cleaners use the lift created by dissolved air in the water introduced near the bottom of the rigid tube to induce suction at the gravel bed. The air must be provided by a separate air pump with an attached air tube arrangement. Both of these powered gravel cleaners return the water back to the aquarium after being directed through a porous filter material.

Another type of powered gravel cleaner is temporarily mounted on the tank rim to perform aquarium gravel cleaning maintenance and then is removed when the process is complete. This gravel cleaner uses an integrated self-priming pump with a top mounted flexible tube that connects to a rigid tube that can be positioned to reach the gravel bed which can be moved about in the aquarium. The water passes through a porous filter material and is returned to the aquarium in a filtered state.

While the prior art discloses various aquarium filters, gravel cleaning devices, and means for draining and replenishing the water in the aquarium, so far as is known, none of these devices and methods resolve the deficiencies noted above, as in the present invention.

SUMMARY OF THE INVENTION

It is an object of the present invention to provide a novel aquarium filter with water stream diversion system and method of use thereof.

It is also an object of the present invention to provide a novel aquarium filter with water stream diversion system and method of use thereof, which makes removal and replenishment of aquarium water easier and eliminates the extra equipment necessary in the prior art.

Additionally, it is an object of the present invention to provide a novel aquarium filter with water stream diversion system which can be positioned anywhere from above the aquarium water level, to the bottom of the aquarium tank, and which can either be connected via tubing or can be submersed in the aquarium water, to draw in water.

It is yet another object of the present invention to provide a novel aquarium filter with water stream diversion system and method of use thereof which can be utilized in changing the water within an aquarium by draining water from the aquarium and/or replenishing water in the aquarium from an outside source.

It is a further object of the present invention to provide a novel aquarium filter with water stream diversion system and method of use thereof which provides an alternate remotely located filter intake and/or filter outlet.

It is another object of the present invention to provide a novel aquarium filter with water stream diversion system and method of use thereof, which can be utilized in conjunction with a gravel cleaning device.

Certain of the foregoing and related objects are readily attained according to the present invention through the provision of an aquarium filter with water stream diversion system, comprising an aquarium pump having an intake to receive water into said pump, an outlet to discharge water from said pump, and means to draw water into said intake and discharge water from said outlet; and a water stream diversion conduit comprising a first open end, a second open end opposite therefrom, and a fluid channel extending therebetween which establishes fluid communication between said first open end and said second open end thereof, wherein said first open end of said conduit is configured and dimensioned to selectively releasably connect in fluid communication with at least one member selected from the group consisting of said intake of said pump and said outlet of said pump, wherein when said first open end of said conduit is connected to said outlet of said pump, water is diverted from said outlet of said pump into said fluid channel of said conduit via said first open end of said conduit and is discharged from said second open end of said conduit, and wherein when said first open end of said conduit is connected to said intake of said pump, water is drawn into said fluid channel of said conduit via said second open end of said conduit and is discharged from said first open end of said conduit into said intake of said pump.

In the preferred embodiment, the water stream diversion conduit comprises a rigid tube connected to a flexible hose. Preferably, the aquarium filter further comprises an intake tube having a first open end submersible in water to define an inlet, a second open end opposite therefrom connected to said intake of said pump to define an outlet, and a fluid channel extending therebetween which establishes fluid communication between said inlet and said outlet thereof, and wherein said intake tube defines an alternate inlet port therein which is configured and dimensioned to releasably connect to said first open end of said conduit; and a removable cap for sealing said alternate inlet port; wherein when said cap is disposed to seal said alternate inlet port of said intake tube, water is drawn into said fluid channel of said intake tube via said inlet of said intake tube and is discharged from said outlet of said intake tube into said intake of said pump, and wherein when said cap is removed from sealing said alternate inlet port of said intake tube and said first end of said conduit is connected to said alternate inlet port, water is drawn into said fluid channel of said conduit via said second open end of said conduit and is discharged from said first open end of said conduit into said intake of said pump.

Advantageously, said intake tube is generally U-shaped comprising a first generally upstanding leg extending upwardly from said intake of said pump, a second generally upstanding leg, and a transversely-disposed base leg connecting said first and said second upstanding legs, and wherein said alternate inlet port is disposed generally adjacent the connection of said first upstanding leg to said base leg and wherein at least a portion of said rigid tube of said water stream diversion conduit is configured and dimensioned to be removably received within said alternate inlet port and said first upstanding leg, when said cap is removed from sealing said alternate inlet port, to releasably connect said first open end of said conduit to said intake of said pump.

Desirably, said outlet of said pump further comprises an upstanding rim and wherein at least a portion of said rigid tube of said water stream diversion conduit is configured and dimensioned to be releasably received within said upstanding rim to releasably connect said first open end of said conduit to said outlet of said pump. It is also preferable that said first open end of said conduit further comprises a notch defined in said rigid tube and wherein when said conduit is received within said upstanding rim of said outlet of said pump, said rigid tube is rotatable to align said notch with said outlet of said pump, to divert water from said outlet of said pump into said conduit.

Preferably, said outlet of said pump further comprises a generally cylindrical sleeve disposed above and spaced apart from said upstanding rim of said outlet of said pump, and wherein said rigid tube is configured and dimensioned to be removably received within said sleeve and said upstanding rim. In the preferred embodiment, said pump further comprises means for filtering the water. Advantageously, the aquarium filter further comprises a gravel cleaning device connected to said second open end of said conduit.

Desirably, the aquarium filter further comprises a pump housing substantially enclosing said aquarium pump, comprising an upper wall defining an opening therein which is configured and dimensioned to removably receive said conduit therein, a front wall defining a plurality of intake openings therein, to permit water to be drawn into said housing, and an outlet opening, to permit water to exit said housing; and a removable cap for closing said opening defined in said upper wall; wherein when said cap is disposed to close said opening defined in said upper wall, water is drawn into said intake of said pump through said plurality of intake openings of said housing and is discharged from said outlet of said pump and subsequently from said housing via said outlet opening of said housing, and wherein when said cap is removed from closing said opening defined in said upper wall of said housing and said first open end of said conduit is received in said opening in said upper wall of said housing and connected with said outlet of said pump, water is drawn into said intake of said pump through said plurality of intake openings of said housing and is discharged from said outlet of said pump into said fluid channel of said conduit via said first open end of said conduit and subsequently discharged from said second end of said conduit. In the preferred embodiment, said first open end of said conduit is alternatively connectable with said intake of said pump and said outlet of said pump.

Certain of the foregoing and related objects are also readily attained according to the present invention through the provision of a method of using an aquarium filter having a water stream diversion system, comprising the steps of providing an aquarium containing water therein; providing an aquarium pump having an intake to receive water into said pump, an outlet to discharge water from said pump, and means to draw water into said intake and discharge water from said outlet; providing a water stream diversion conduit comprising a first open end, a second open end opposite therefrom, and a fluid channel extending therebetween which establishes fluid communication between said first open end and said second open end thereof, wherein said first open end of said conduit is configured and dimensioned to selectively releasably connect in fluid communication with at least one member selected from the group consisting of said intake of said pump and said outlet of said pump; connecting said first open end of said conduit to a member selected from the group consisting of said intake of said pump and said outlet of said pump, wherein when said first open end of said conduit is connected to said outlet of said pump, water is diverted from said outlet of said pump into said fluid channel of said conduit via said first open end of said conduit and is discharged from said second open end of said conduit, and wherein when said first open end of said conduit is connected to said intake of said pump, water is drawn into said fluid channel of said conduit via said second open end of said conduit and discharged from said first open end of said conduit into said intake of said pump.

Preferably, the method further comprises connecting said first open end of said conduit to said outlet of said pump; positioning said second open end of said conduit within said aquarium; and diverting water from said outlet of said pump into said fluid channel of said conduit via said first open end of said conduit, and discharging water from said second open end of said conduit into said aquarium, for an alternate filter outlet.

It is also preferred that the method further comprises connecting said first open end of said conduit to said outlet of said pump; positioning said second open end of said conduit externally of said aquarium and; diverting water from said outlet of said pump into said fluid channel of said conduit via said first open end of said conduit, and discharging water from said second open end of said conduit externally of said aquarium, to drain water from said aquarium. Desirably, the method further comprises connecting said first open end of said conduit to said inlet of said pump; positioning said second open end of said conduit within said aquarium; and drawing water into said fluid channel of said conduit via said second open end of said conduit and discharging water from said first open end of said conduit into said intake of said pump, for an alternate filter intake.

Advantageously, the method further comprises connecting said first open end of said conduit to said inlet of said pump; providing an external source of water; connecting said second open end of said conduit in fluid communication with said external source of water; and drawing water into said fluid channel of said conduit via said second open end of said conduit from said external source of water and discharging water from said first open end of said conduit into said intake of said pump, to fill said aquarium.

In the preferred embodiment, said pump further comprises an intake tube having a first open end submersible in water to define an inlet, a second open end opposite therefrom connected to said intake of said pump to define an outlet, and a fluid channel extending therebetween which establishes fluid communication between said inlet and said outlet thereof, and wherein said intake tube defines an alternate inlet port therein which is configured and dimensioned to releasably connect to said first open end of said conduit; and a removable cap for sealing said alternate inlet port; wherein when said cap is disposed to seal said alternate inlet port of said intake tube, water is drawn into said fluid channel of said intake tube via said inlet of said intake tube and is discharged from said outlet of said intake tube into said intake of said pump; removing said cap from sealing said alternate inlet port of said intake tube; connecting said first open end of said conduit to said alternate inlet port; and drawing water into said fluid channel of said conduit via said second open end of said conduit and discharging water from said first open end of said conduit into said intake of said pump.

Preferably, said intake tube is generally U-shaped comprising a first generally upstanding leg extending upwardly from said intake of said pump, a second generally upstanding leg, and a transversely-disposed base leg connecting said first and said second upstanding legs, and wherein said alternate inlet port is disposed generally adjacent the connection of said first upstanding leg to said base leg and wherein said method further comprises removing said cap from sealing said alternate inlet port, inserting said conduit into said alternate inlet port and said first upstanding leg, and connecting said first open end of said conduit to said intake of said pump. It is also preferred that said outlet of said pump further comprises an upstanding rim which is configured and dimensioned to releasably receive said first open end of said conduit therein.

Advantageously, said pump further comprises means for filtering the water; and said method further comprises the step of filtering water with said means for filtering. Desirably, the method further comprises providing a gravel cleaning device connected to said second open end of said conduit; connecting said first open end of said conduit to said inlet of said pump; positioning said second open end of said conduit connected to said gravel cleaning device within said aquarium; and drawing water into said gravel cleaning device and subsequently into said fluid channel of said conduit via said second open end of said conduit and discharging water from said first open end of said conduit into said intake of said pump, to clean gravel using said gravel cleaning device.

It is also preferred that said water stream diversion conduit comprises a rigid tube connected to a flexible hose. Desirably, the method further comprises a pump housing substantially enclosing said aquarium pump, comprising an upper wall defining an opening therein which is configured and dimensioned to removably receive said conduit therein, a front wall defining a plurality of intake openings therein, to permit water to be drawn into said housing, and an outlet opening, to permit water to exit said housing; and a removable cap for closing said opening defined in said upper wall; wherein when said cap is disposed to close said opening defined in said upper wall, water is drawn into said intake of said pump through said plurality of intake openings of said housing and is discharged from said outlet of said pump and subsequently from said housing via said outlet opening of said housing; and wherein said method further comprises removing said cap from closing said opening defined in said upper wall of said housing; inserting said first open end of said conduit through said opening in said upper wall of said housing; connecting said first open end of said conduit with said outlet of said pump; and drawing water into said intake of said pump through said plurality of intake openings of said housing and discharging water from said outlet of said pump into said fluid channel of said conduit via said first open end of said conduit and subsequently discharging the water from said second end of said conduit. Advantageously, said first open end of said conduit is alternately connectable with said intake of said pump and said outlet of said pump.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are to be used for the purpose of illustration only and not as a definition of the limits of the invention.

DETAILED DESCRIPTION OF THE PREFERRED EMBODIMENTS

Figure 1:
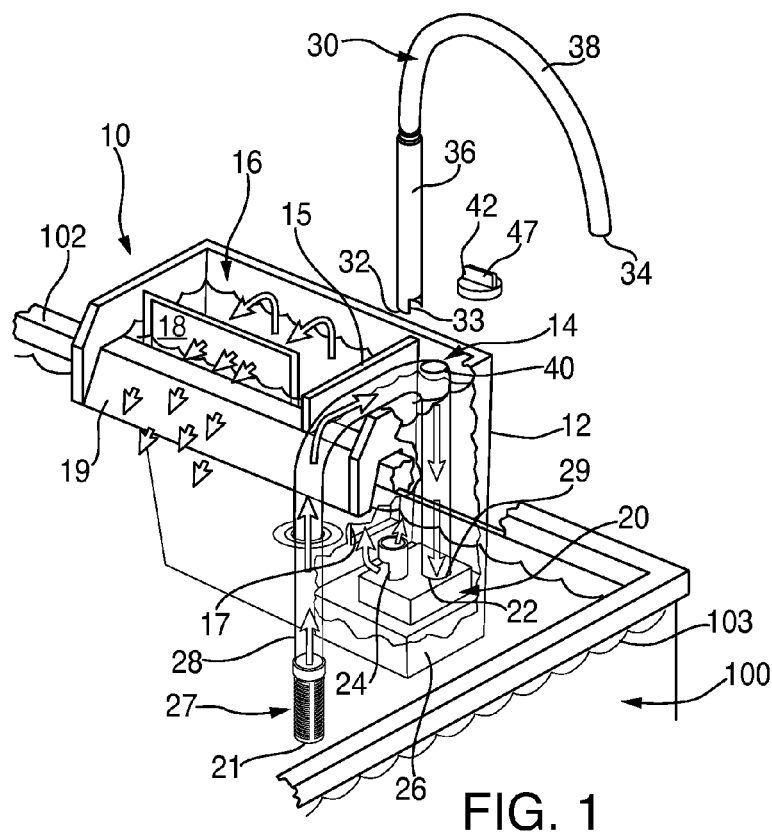
FIG. 1 is a perspective view of the first external, hang-on filter embodiment of the aquarium filter with water stream diversion system, according to the present invention.

Turning now in detail to the drawings and FIG. 1 in particular, which shows the first embodiment of the present invention, namely the aquarium filter with water stream diversion system, generally designated by reference numeral 10. Aquarium filter system 10 is for use in an aquarium 100 containing water 103 therein and is reconfigurable to provide for various configurations and multiple methods of use thereof.

Figure 11:
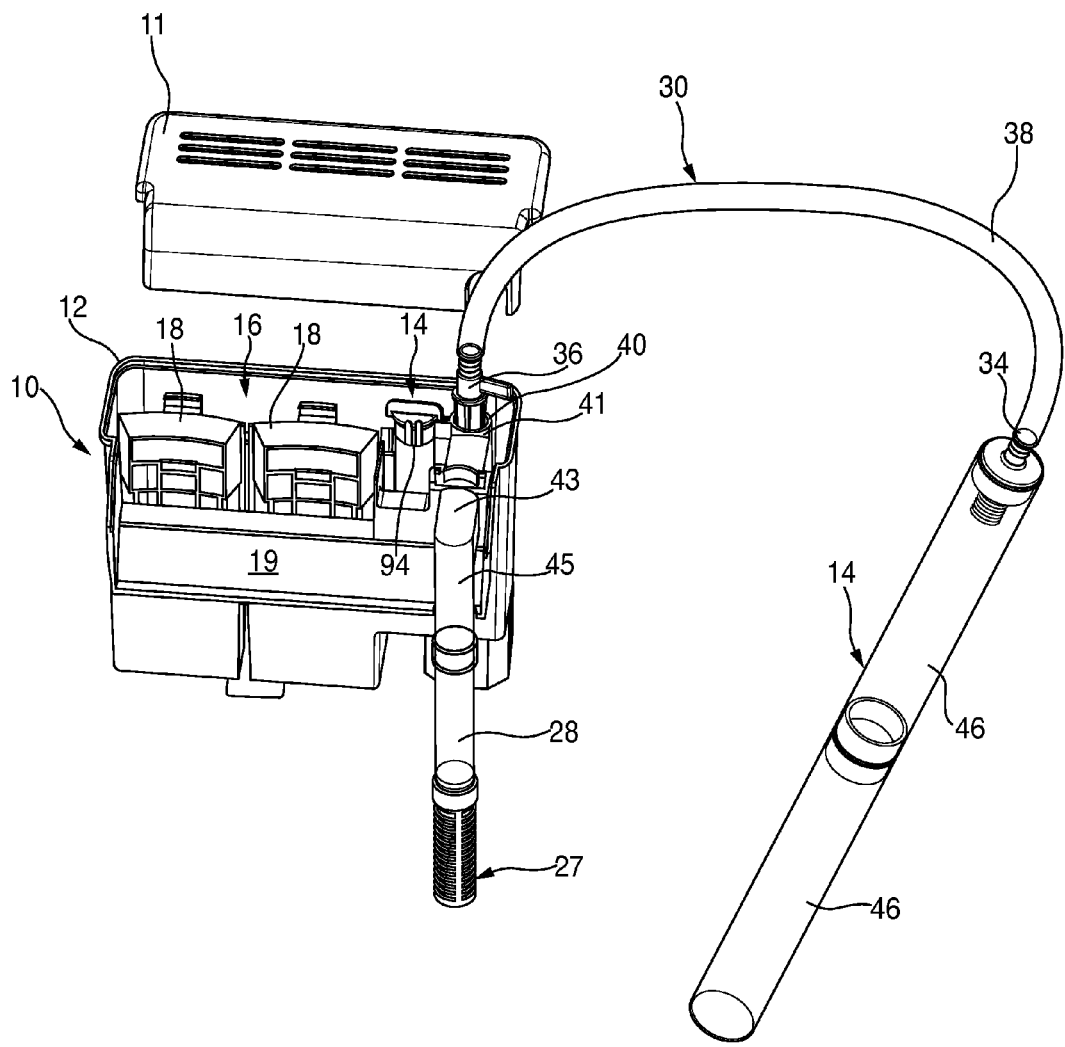
FIG. 11 is a perspective view of the filter with the water stream diversion conduit connected to the filter intake and having a gravel cleaning device connected thereto.

Filter system 10, shown in FIGS. 1-6 and 11-12, is of the external hang-on arrangement type filter, which includes a filter box or housing 12 that is supported externally on the top rim 102 of aquarium 100. As seen in FIG. 11, housing 12 optionally includes a removable cover 11 shielding the interior of the housing 12. Filter system 10 includes an aquarium pump system having water stream diversion means, generally designated by reference numeral 20. As shown best in FIGS. 1 and 12, pump system 20 includes pumping means, such as an integral motor-driven water pump 26 having an intake 22 to receive water into pump 26, and an outlet 24 to discharge water from pump 26. In operation, pump 26 creates suction to draw aquarium water 103 into intake 22 and discharge water from outlet 24. While the pumping means illustrated in FIG. 1 are an integral water pump 26, other pumping means can be utilized to draw water into the intake 22 and discharge water from outlet 24 and such pumping means would be well known to those having ordinary skill in the art.

During normal pump operation, pump system 20 is in communication with the aquarium water 103 via a fixed, generally inverted U-shaped intake tube 28, which extends from pump system 20, over top rim 102 of aquarium 100, and into the aquarium water 103 (see, FIGS. 1-6 and 11). More particularly, as seen in FIG. 1, intake tube 28 has a first open end 27 which is submersible in the water 103 contained in aquarium 100, to define an inlet or intake. As seen best in FIGS. 1 and 12, intake tube 28 has an opposite, second open end 29 which is connected, in fluid communication, with intake 22 of pump system 20 to define an outlet. A fluid channel extends through intake tube 28 to establish fluid communication between first open end 27 and second open end 29 and thus, between the aquarium water 103 and pump 26. Preferably, as seen best in FIG. 11, a generally cylindrical gate or screen 21 covers the first open end 27 to prevent fish from being drawn into intake tube 28 by the suction created by pump 26, but to allow the water to be drawn in.

Figure 2:
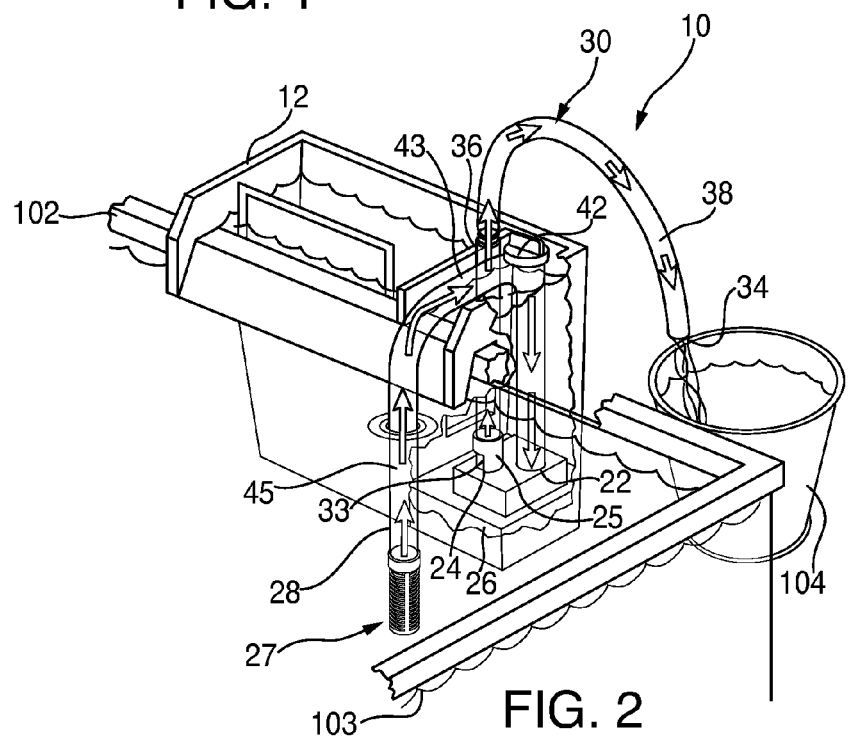
FIG. 2 is a perspective view similar to FIG. 1, but with the conduit connected to the pump outlet, to drain water from the aquarium.

In a preferred embodiment of the present invention, as shown in FIGS. 2 and 11, intake tube 28 includes a first generally vertically disposed leg 41 extending upwardly from intake 22 of pump system 20, which is connected to a generally horizontally disposed leg 43 which extends over the top rim 102 of aquarium 100. Leg 43 is connected to a generally vertically disposed second leg 45, which extends into the aquarium water 103.

As shown in FIG. 1, first open end 27 of intake tube 28 extends into the water 103 and is submersed below the surface of the water, to draw water 103 into the fluid channel of intake tube 28 via first open end 27. During normal pump operation, the water 103 travels through intake tube 28 and is subsequently discharged from second open end 29 into the intake 22 of pump system 20, via the suction created by water pump 26. Pump 26 may be permanently attached to filter box 12 or removable from filter box 12.

Figure 12:
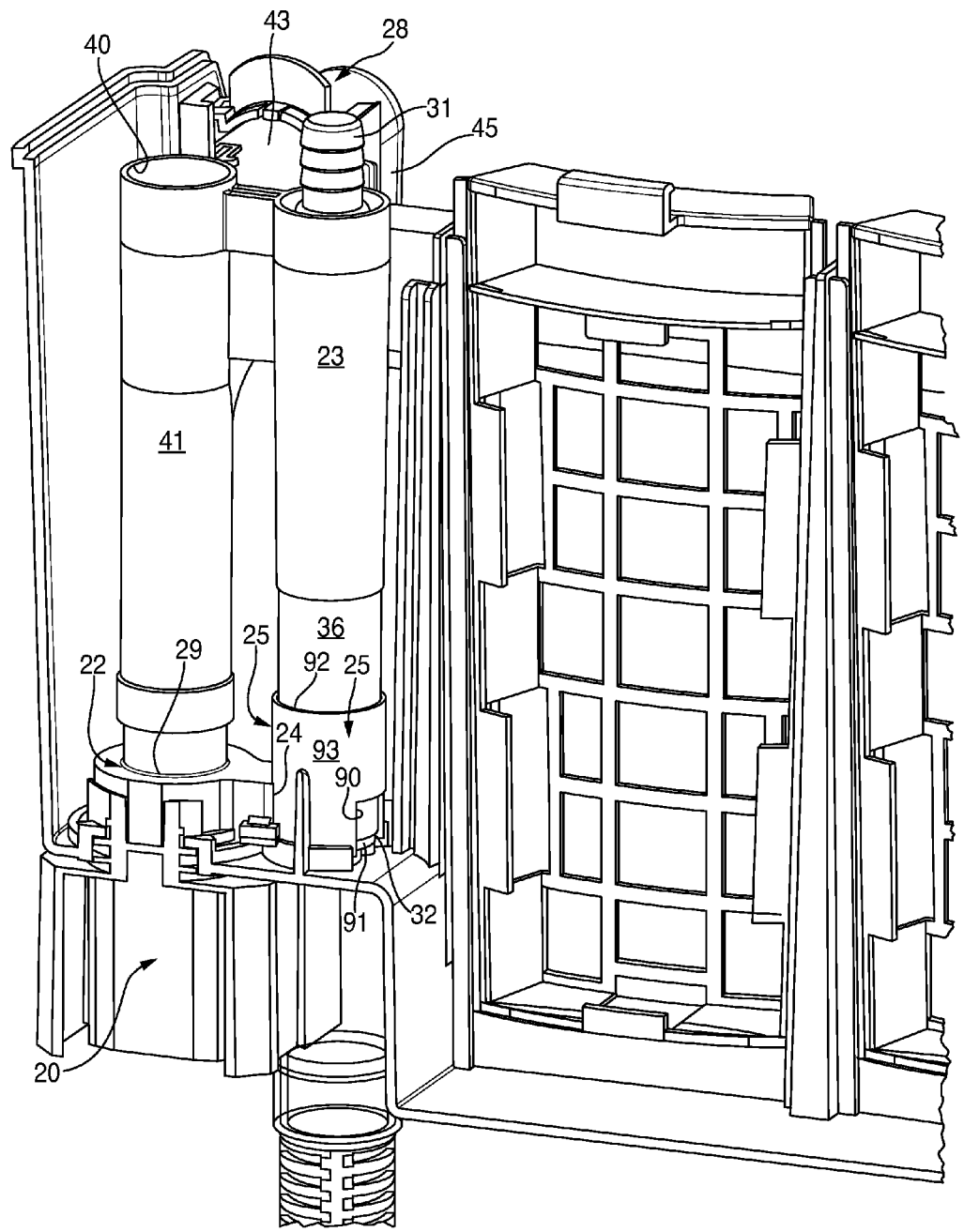
FIG. 12 is an enlarged broken sectional view of the pump intake and outlet of the external filter embodiment having the rigid tube of the water stream diversion conduit connected to the pump outlet.

As also seen in FIGS. 1-6, filter housing 12 is divided via a dividing wall 15 into a water chamber 14 and a filtration chamber 16. As also seen in FIGS. 1-6, dividing wall 15 has an opening 17 defined therein which allows fluid communication between water chamber 14 and filtration chamber 16. During normal pump operation, pump 26 will draw aquarium water 103 into pump system 20 via intake tube 28. The water is subsequently discharged from outlet 24 of pump system 20 into water chamber 14. The water is then directed through opening 17 in dividing wall 15, from water chamber 14 into filtration chamber 16. In filtration chamber 16, as seen in FIGS. 1 and 11-12, water is filtered using one or more filtration media, such as filter cartridges 18, before being returned into aquarium 100. As seen in the embodiment in FIGS. 11-12, filter 10 includes two filter cartridges 18. Various known filtration methods may be utilized and such filtration methods are well known to those having ordinary skill in the art. As seen in FIG. 1, filter 10 also includes a spillway 19 which extends from filtration chamber 16 over top rim 102, to allow water to return to aquarium 100. In use, and as seen in FIG. 1, water passes through filter cartridge 18 and is returned to the aquarium 100, via a spillway 19.

Figure 3:
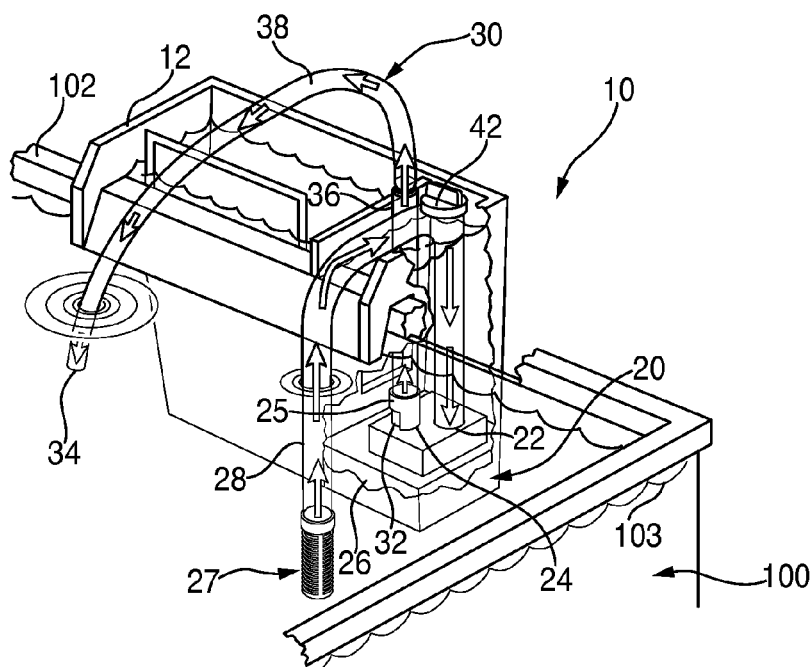
FIG. 3 is a perspective view similar to FIG. 2, but with the outlet of the conduit located within the aquarium, to serve as a remote filter outlet.

Furthermore, as also seen in FIGS. 1 and 11-12, intake tube 28 has an opening defined therein forming an alternate inlet port 40. Preferably, alternate inlet port 40 is disposed at the connection of leg 41 to leg 43. A cap 42 is removably received within alternate inlet port 40 to seal intake tube 28 from the external atmosphere. In the preferred embodiment, cap 42 has an upwardly projecting tab 47 to facilitate manual grasping of cap 42. In the external filter embodiment shown in FIG. 1, cap 42 is sealed within alternate inlet port 40 via an O-ring (not shown). When cap 42 is sealingly engaged with alternate inlet port 40, as shown in FIGS. 2-3, cap 42 seals intake tube 28 and water is drawn into first open end 27 of intake tube 28 and subsequently discharged from second open end 29 into intake 22 of pump system 20. Preferably, cap 42 is a hermetically sealed removable cap, which when in place, allows the filter 10 to operate normally. While it is shown and described with cap 42 received within an opening in intake tube 28 forming alternate inlet port 40, other methods of releasably sealing alternate inlet port 40 may be utilized.

Figure 10:
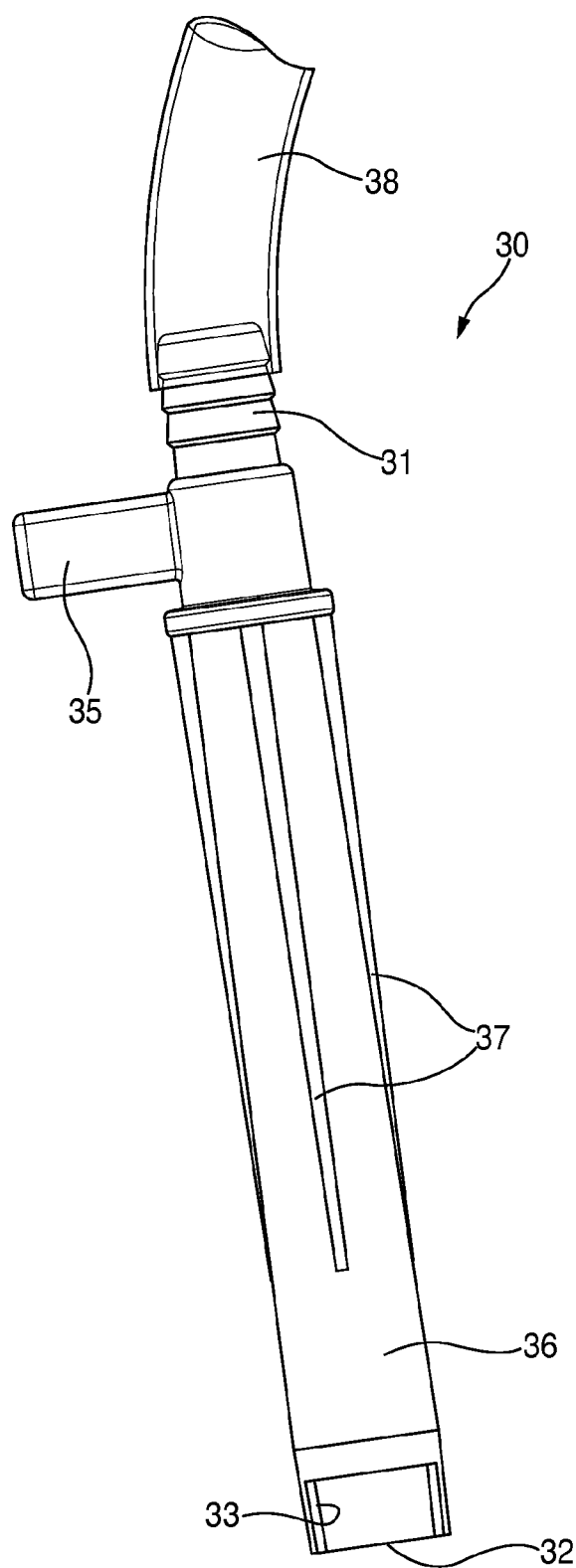
FIG. 10 is a perspective view of the rigid tube and flexible hose of the water stream diversion conduit.

As also seen in FIGS. 1 and 10, filter 10 includes a water stream diversion conduit, generally designated by reference numeral 30. Preferably, water stream diversion conduit 30 comprises a rigid tube 36 connected to a flexible hose 38. Conduit 30 has a first open end 32 disposed on rigid tube 36, a second open end 34, opposite therefrom, which is disposed on flexible hose 38, and a fluid channel extending through conduit 30 which establishes fluid communication between first open end 32 and second open end 34.

As seen best in FIG. 10, rigid tube 36 has a barbed end 31 which engages with the flexible hose 38 to secure it in place. As also seen in FIG. 10, rigid tube 36 has a flag 35 extending outwardly therefrom, which is utilized to lock the rigid tube in place when connected to pump system 20 and prevent rotation thereof as well as aid a user in grasping rigid tube 36. In the preferred embodiment, rigid tube 36 is tapered to aid in manufacturing and removal from the manufacturing molds. Furthermore, in the preferred embodiment, external ribs 37 are formed on the outside of rigid tube 36. Additionally, as shown best in FIG. 10, first open end 32 of conduit 30 has a notch 33 formed therein.

As seen in FIGS. 1-6 and 11-12, first open end 32 of conduit 30 is configured and dimensioned to selectively and releasably connect in fluid communication with intake 22 of pump system 20 and/or outlet 24 of pump system 20. In the preferred embodiment, outlet 24 of pump system 20 includes an upstanding rim 25 (see, FIG. 12) which is configured and dimensioned to releasably connect with first open end 32 of conduit 30. As seen in FIG. 12, upstanding rim 25 has a generally cylindrical side wall 93 having a top edge defining an opening 92 therebetween as well as a side opening 90 defined in a portion of side wall 93, opposite the pump outlet. During normal pump operation, water exits the pump 26 via openings 90 and 92.

Particularly, as seen in FIG. 12, in the preferred embodiment, outlet 24 of pump 20 includes a lower generally cylindrical upstanding rim 25 and optionally, an upper generally cylindrical sleeve 23 which is disposed above and spaced apart from upstanding rim 25. In use, rigid tube 36 is removably inserted into sleeve 23 and upstanding rim 25 and received therein with the first open end 32 of conduit 30 disposed adjacent to bottom wall 91 of outlet 24. Once rigid tube 36 is received within sleeve 23 and upstanding rim 25, it is rotatable in order to align notch 33 with the outlet from pump 26, to divert the water into rigid tube 36 via notch 33. In order to lock conduit 30 in place, flag 35 is received within a corresponding slot 94 (see, FIG. 11) formed in sleeve 23, to prevent rotation thereof.

Furthermore, as seen in FIG. 11, alternate inlet port 40 is configured and dimensioned to releasably connect with first open end 32 of conduit 30, when cap 42 is removed. Particularly, as shown in FIGS. 4-6 and 11, rigid tube 36 is receivable within alternate inlet port 40 and first vertical leg 41 in order to connect the first open end 32 of conduit 30 to intake 22 of pump 26.

When filter 10, according to the present invention is used without the conduit 30, as illustrated in FIG. 1, but with cap 42 sealing port 40, the flow of water 103 in filter 10 will follow through the traditional path of being drawn into intake tube 28, subsequently into intake 22 of pump system 20, where it is discharged from outlet 24 of pump system 20 into water chamber 14. The water then travels from water chamber 14 into filtration chamber 16, where it is filtered and finally directed via spillway 19 to return into the aquarium 100.

As seen in FIGS. 2, 3 and 12, in a first configuration of the filter 10 according to the present invention utilizing conduit 30 as a water stream diverter, first open end 32 of rigid tube 36 of conduit 30 is connected to upstanding rim 25 of outlet 24 of pump system 20. In this configuration shown in FIGS. 2, 3 and 12 water is drawn into pump system 20 via intake tube 28 and is discharged from pump system 20 via outlet 24. Instead of the water being directed into water chamber 14 as in the normal pump operation, the water discharged from outlet 24 is diverted into the fluid channel of conduit 30 via notch 33. The water is subsequently discharged from second open end 34 of flexible hose 38 of conduit 30. Thus, in the configuration of filter 10 in FIGS. 2, 3 and 12 the water is diverted away from water chamber 14, filtration chamber 18, and spillway 19, via conduit 30.

In the configuration of filter 10 in FIGS. 2, 3 and 12, conduit 30 can be utilized either to drain water from aquarium 100 (FIG. 2) or utilized as an alternate remote filter outlet for filter 10 (FIG. 3). Particularly, the configuration of filter 10 in FIG. 2 can be utilized to direct water away from aquarium 100 and drain water 103 from aquarium 100, into an external receptacle, such as, for example, bucket 104 or into a sink or drain (not shown). This allows water 103 to be removed from the aquarium 100 and later replenished with clean water. In the configuration shown in FIG. 3, conduit 30 can also be used as an alternate remote filter outlet for aquarium 100. Particularly, second open end 34 of conduit 30 can be placed in any location within aquarium 100, to direct the flow of water discharged from outlet 24 into conduit 30 and back into the aquarium 100, to serve as a remote filter outlet and increase circulation within the aquarium.

In a second configuration of the filter 10, as seen in FIGS. 4-6 and 11, cap 42 is removed from sealing alternate inlet port 40 of intake tube 28. First open end 32 of rigid tube 36 of conduit 30 is inserted within alternate inlet port 40 and upstanding leg 41, such that conduit 30 is in fluid communication with intake 22 of pump 20. In this configuration in FIGS. 4-6 and 11, water 103 is drawn into the fluid channel of conduit 30 via second open end 34 of flexible hose 38 of conduit 30 and is discharged from first open end 32 of rigid tube 36 of conduit 30 into intake 22 of pump system 20. Water is then discharged from outlet 24 of pump system 20, to resume its normal flow of water into water chamber 14 and subsequently into filtration chamber 18 where it is filtered and returned to aquarium 100 over spillway 19. Thus, in the configuration of filter 10 in FIGS. 4-6 and 11, the water is diverted from flowing into the first open end 27 of intake tube 28, by removing cap 42 and connecting conduit 30.

Figure 4:
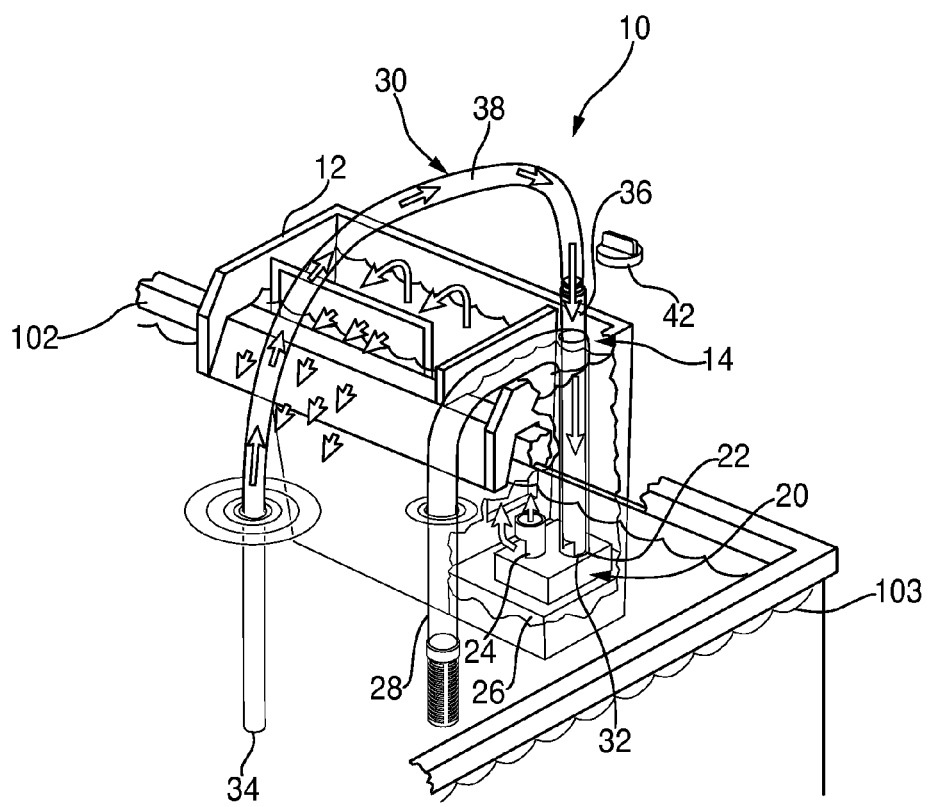
FIG. 4 is a perspective view similar to FIG. 1, but with the cap removed from the alternative inlet port, the conduit connected to the pump intake, and the intake of the conduit located within the aquarium, to serve as a remote filter intake.
Figure 5:
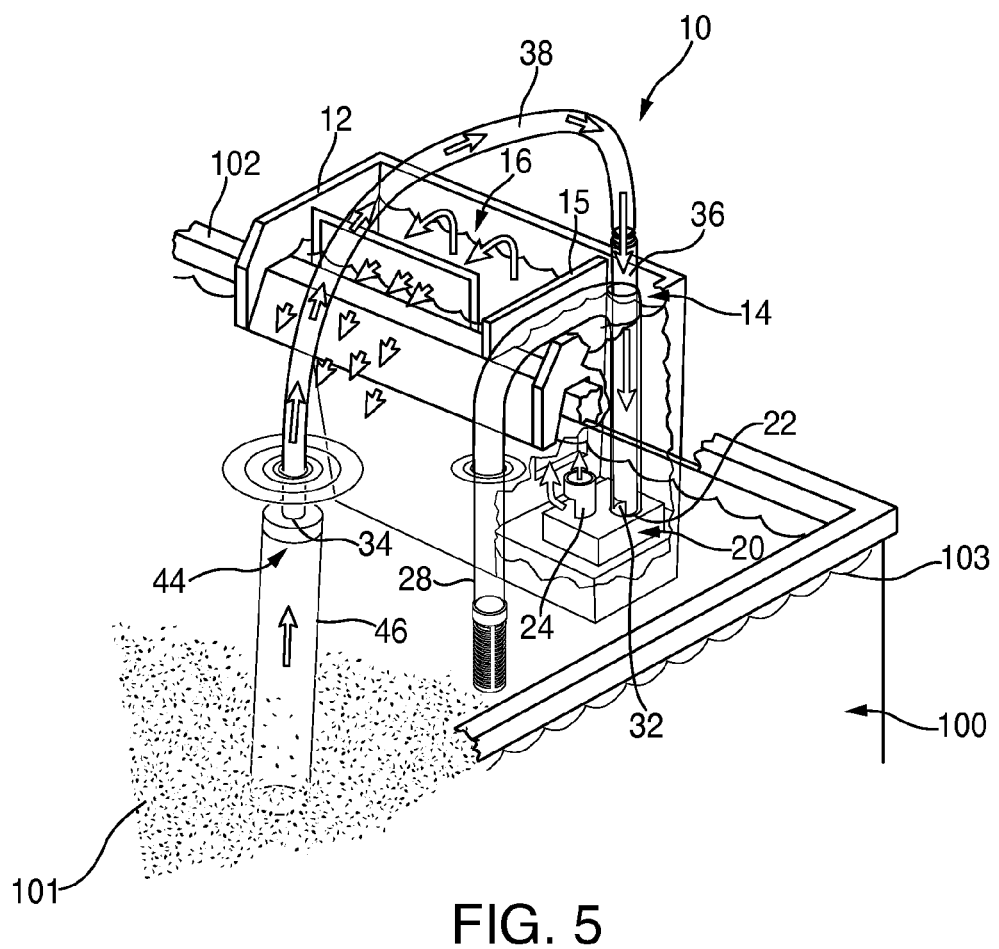
FIG. 5 is a perspective view similar to FIG. 4, but with the intake of the conduit connected to a gravel cleaning device.

In the configuration shown in FIGS. 4-6 and 11, conduit 30 can be utilized as either an alternate filter intake within the aquarium 100 (FIG. 4), to draw water into aquarium 100 from an external water source (FIG. 6), or in connection with a gravel cleaning device (FIGS. 5 and 11). Particularly, as seen in FIG. 4, when conduit 30 is connected to alternate inlet port 40, due to the flexible nature of flexible hose 38, the second end 34 of flexible hose 38 of conduit 30 can be positioned at any desired location within the aquarium 100 and submersed into the water 103 to draw water in from that desired location. Therefore, in this configuration illustrated in FIG. 4, second open end 34 of conduit 30 is an alternate filter intake, drawing water into the fluid channel of conduit 30 via second open end 34 and discharging water from first open end 32 of conduit 30, into intake 22 of pump system 20, to resume its normal flow of water into water chamber 14 and subsequently into filtration chamber 18 where it is filtered and returned to aquarium 100 over spillway 19. This configuration of filter 10 in FIG. 4 is useful in increasing circulation within aquarium 100 since it can be placed in varying locations within aquarium 100 remote from the intake 28.

In this same configuration of filter 10 shown in FIG. 4, second open end 34 of conduit 30 can be connected to a gravel cleaning device 44, as shown in FIGS. 5 and 11. Since second open end 34 of conduit 30 is not fixed in place, like open end 27 of fixed intake tube 28, hose 38 can be positioned at different desired locations within aquarium 100. Thus, second open end 34 of conduit 30 can be connected to a conventional gravel cleaning device 44 common in aquarium maintenance and moved around the aquarium. Conventional gravel cleaning device 44 comprises a length of hollow rigid tubing 46 connectable to second open end 34 of conduit 30. In a preferred embodiment in FIG. 11, two sections of tubing 46 are connected. Preferably, each length of tubing 46 are 11" in length, however, other suitable dimensions can be utilized.

As shown in FIGS. 5-11, rigid tubing 46 has a larger diameter than the diameter of flexible hose 38 in order to provide a reduced concentration of suction within rigid tubing 46 to allow gravel 101 to be drawn up into rigid tube(s) 46, circulate, and drop back down after being disturbed to remove waste material that has been deposited in the gravel bed 101. The waste material is then pumped together with water into conduit 30 and subsequently directed into the intake 22 of pump system 20 and discharged via outlet 24, to resume its normal flow of water into water chamber 14 and subsequently, into filtration chamber 18 where the waste is filtered from the water 103 and the water is returned to aquarium 100 over spillway 19.

Figure 6:
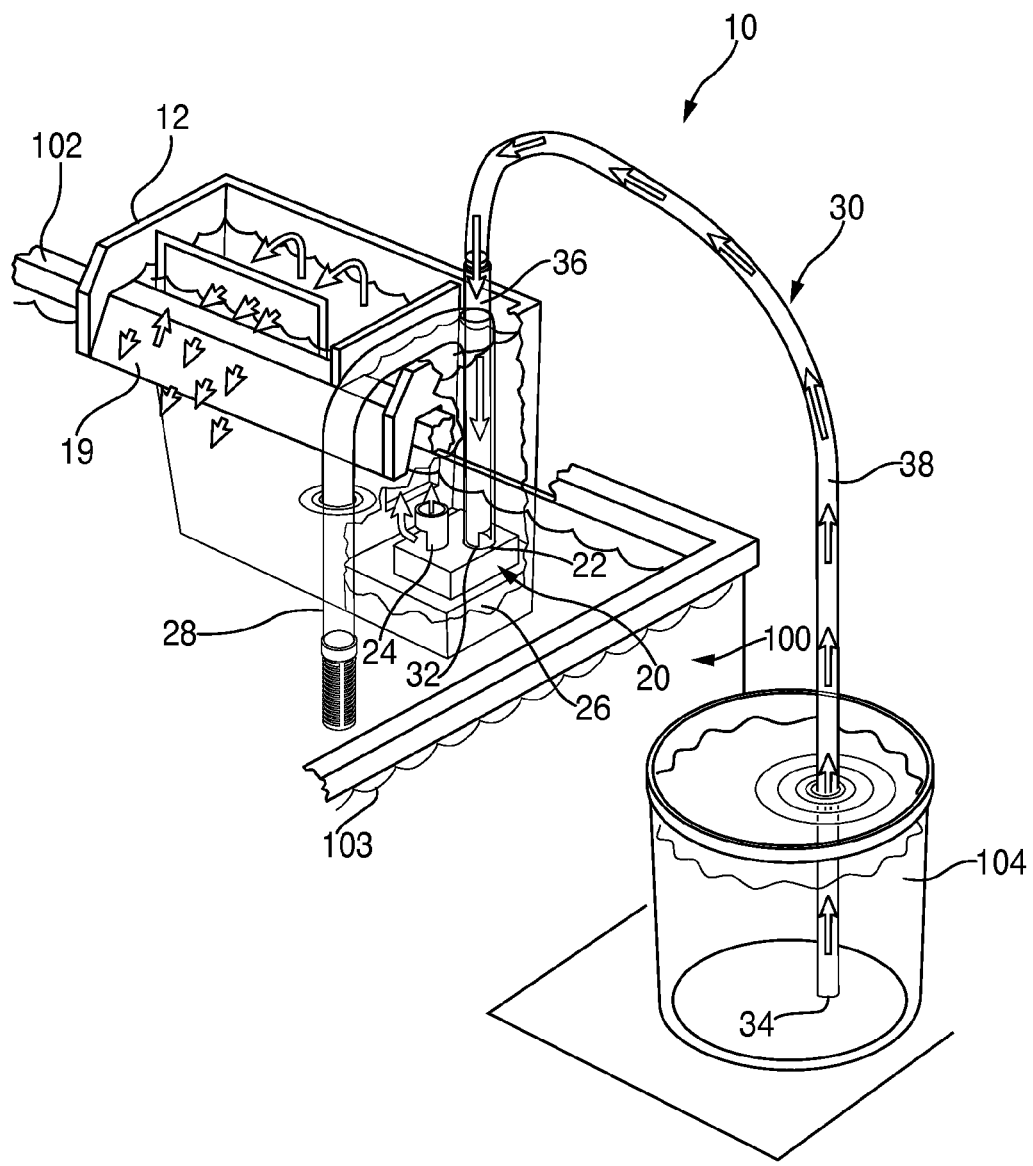
FIG. 6 is a perspective view similar to FIG. 4, but with the intake of the conduit connected to an external water source, to replenish water in the aquarium.

As shown in FIG. 6, in the same configuration of conduit 30 as shown in FIGS. 4 and 5, filter 10 can be utilized to draw water into the aquarium 100 from an external water source, to replenish water drained or removed from aquarium 100. Particularly, as seen in FIG. 6, when conduit 30 is connected to alternate inlet port 40, due to the flexible nature of flexible hose 38, the second end 34 of flexible hose 38 of conduit 30 can be connected to an external water source, such as bucket 104 containing water therein. However, the external water source may be any other suitable source of water such as, for example, a faucet or hose (not shown). Water is drawn into conduit 30 from the bucket 104 via the second open end 34 of conduit 30, and is subsequently directed into the intake 22 of pump system 20 and discharged via outlet 24, to resume its normal flow of water into water chamber 14 and subsequently into filtration chamber 18 where it is filtered and discharged into aquarium 100 over spillway 19.

This arrangement for replenishing the aquarium water shown in FIG. 6 is advantageous as the water being added to the aquarium returns into the aquarium 100 via spillway 19 and will not require removal of the aquarium cover 11 or lighting that is usually blocking access to the surface of the water in the aquarium 100. Secondly, water returning to the aquarium 100 will not be disruptive to the aquarium decorative set-up since it is gently pouring into the aquarium 100 from the spillway 19, instead of the uncontrolled flow of water typical when pouring from a bucket into an aquarium.

Figure 7:
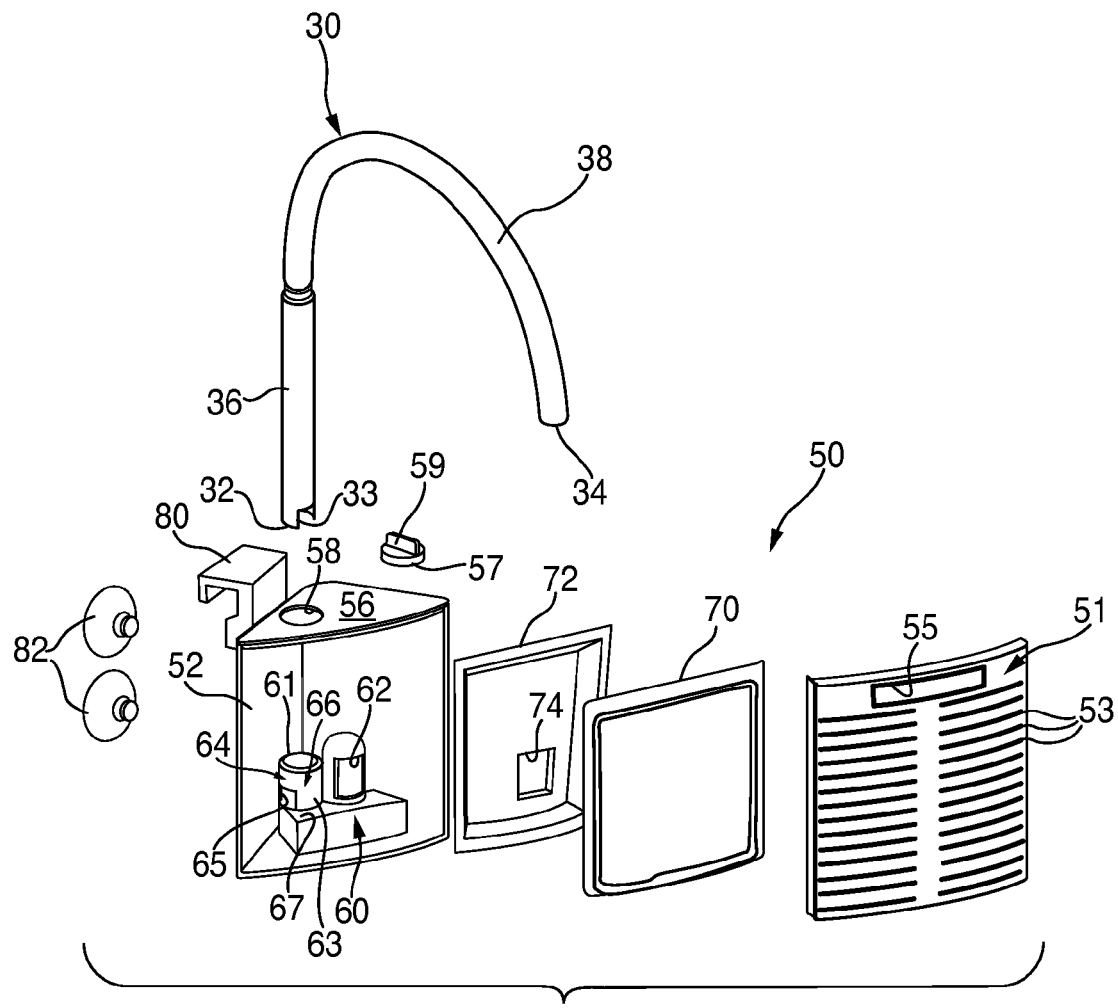
FIG. 7 is an exploded perspective view of the second internal filter embodiment of the aquarium filter with water stream diversion system, according to the present invention.
Figure 8:
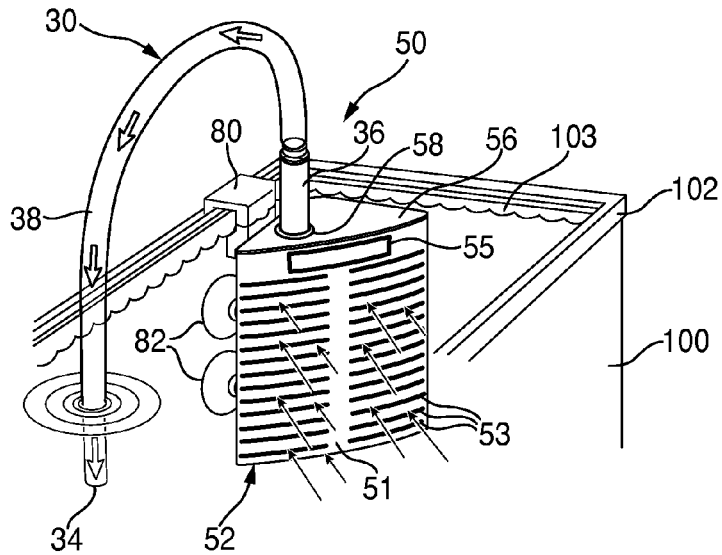
FIG. 8 is a perspective view of the embodiment in FIG. 7, but with the cap removed from the filter housing, the conduit connected to the pump outlet, and the outlet of the conduit located within the aquarium to serve as a remote filter outlet.
Figure 9:
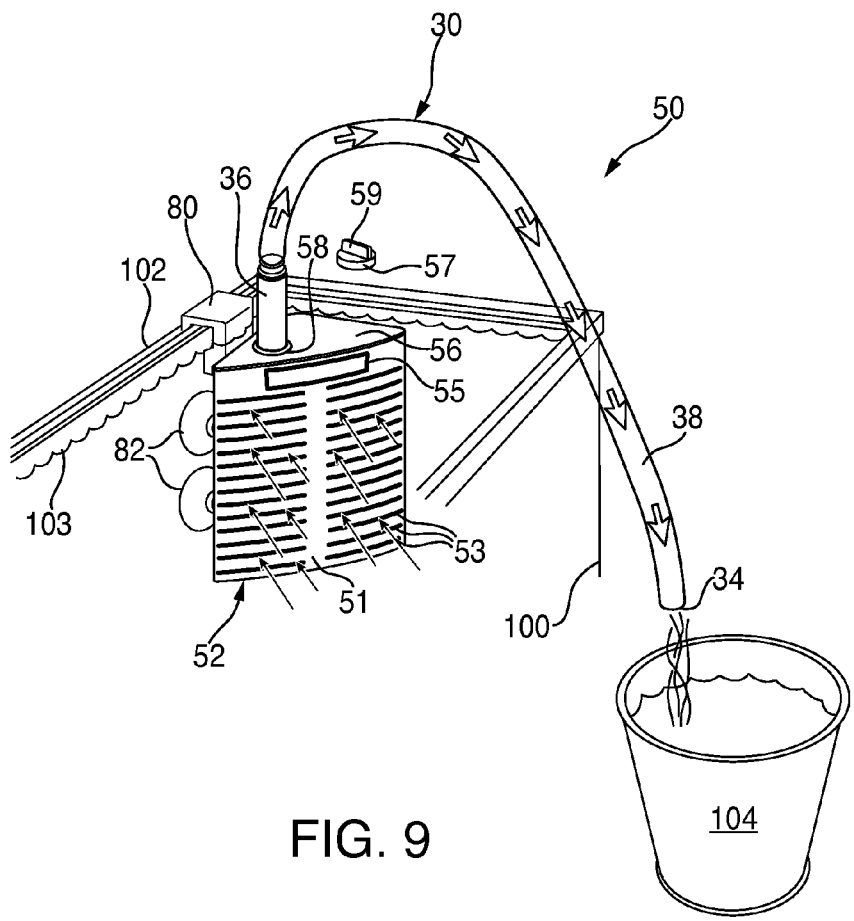
FIG. 9 is a perspective view similar to FIG. 8, but with the outlet of the conduit located externally from the aquarium to drain water from the aquarium.

Turning now in detail to FIGS. 7-9 and 13 illustrating a second embodiment of the present invention, namely, the aquarium filter with water stream diversion system, generally designated by reference numeral 50. Filter 50, shown in FIGS. 7-9 and 13, is of the internal filter arrangement type filter, which is intended to be mounted within aquarium 100 and submersed within the water 103 contained therein. As seen in FIGS. 8-9, filter 50 is preferably secured within aquarium 100 using mechanical means such as a bracket or clamp 80 to secure filter 50 at a fixed height within the aquarium 100 and/or suction cups 82. However, other means to secure filter 50 within aquarium 100 can be utilized and such means would be well known to those having ordinary skill in the art.

As seen in FIGS. 7-9 and 13, filter 50 includes a pump housing 52 substantially enclosing an integral, submersible motor-driven water pump 60 which operates by being submersed in the aquarium water 103 and creates suction to draw in water from the aquarium 100. As seen in FIG. 7, housing 52 includes a front wall or filter intake grill 51 defining a plurality of intake openings 53 therein, to permit water 103 to be drawn into pump housing 52. Filter intake grill 51 also defines an outlet opening 55 therein, to permit water to exit housing 52. As seen best in FIG. 7, pump housing 52 encloses pump 60 having an intake or inlet 62, to permit water to be drawn into the pump 60, and an outlet 64, to discharge water from the pump 60.

During normal operation of filter 50, aquarium water 103 is drawn into the plurality of intake openings 53 of filter intake grill 51, by pump 60 (see, FIGS. 8-9). The water travels through the intake openings 53, and subsequently through a filter cartridge 70 located inside of the pump housing 52 inwardly from filter intake grill 51. Preferably, filter cartridge 70 is a porous pad, that collects aquarium debris before the water enters pump 60. However, other known filtration methods can be utilized and would be well known to those having ordinary skill in the art. For example, chemical media such as carbon and zeolite and/or biological media such as porous ceramic cylinders for water treatment, can be enclosed within pump housing 52.

Preferably, as shown in FIG. 7, filter 50 also includes an internal dividing wall 72 located inwardly from filter cartridge 70. Internal dividing wall 72 has an opening 74 defined therein, preferably in alignment with intake 62 of pump 60, to direct the suction created by pump 60 to pull the water 103 through filter cartridge 70 and through opening 74 of wall 72 and into intake 62 of pump 60. During normal pump operation, the water drawn into intake 62 of pump 60 is subsequently discharged from outlet 64 of pump 60, to exit filter 50 through outlet opening 55 of front intake grill 51.

Figure 13:
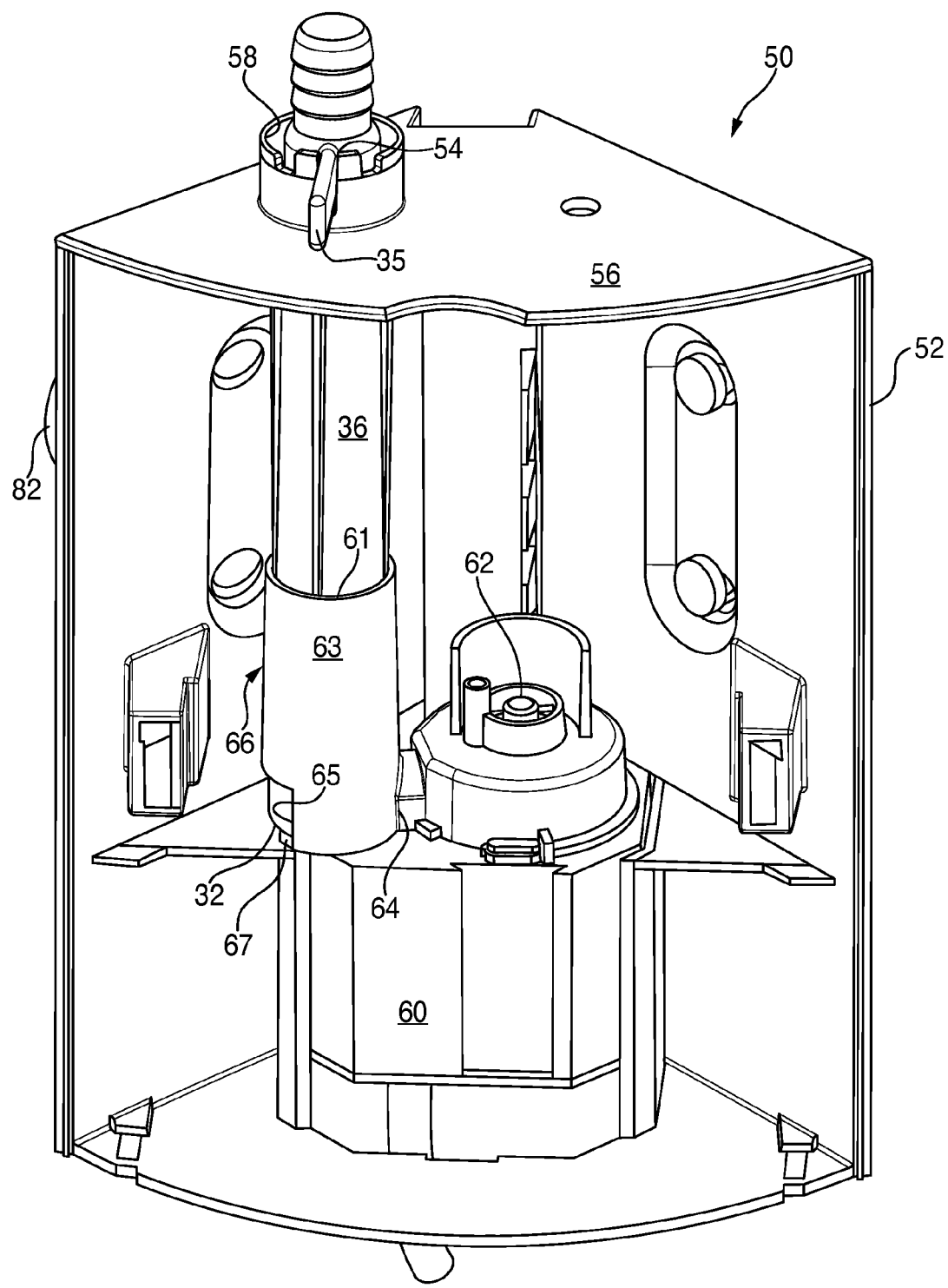
FIG. 13 is an enlarged sectional view of the pump intake and outlet of the external filter embodiment, with the rigid tube of the water stream diversion conduit connected to the pump outlet.

As seen best in FIG. 13, outlet 64 has an upstanding rim 66 formed by a generally cylindrical side wall 63 having a top edge 61, a side opening 65 defined in a portion of side wall 63 opposite the pump outlet, and a base wall 67. During normal pump operation, water exits pump 60 via openings 61 and 65.

As seen in FIGS. 7-9 and 13, pump housing 52 also includes an upper wall 56 defining an opening therein 58. Filter 50 includes a removable cap 57 received within opening 58 defined in upper wall 56. Preferably, cap 57 has an upwardly projecting tab 59 to facilitate manual grasping. In the preferred embodiment, cap 57 is received within opening 58 via a slight friction fit. When cap 57 is disposed within opening 58 in upper wall 56, water is drawn into intake 62 of pump 60 through intake openings 53 of housing 52 and is discharged from outlet 64 of pump 60 and subsequently from housing 52 via outlet opening 55.

As also seen in FIGS. 7-9, filter 50 includes a water stream diversion conduit, generally designated by reference numeral 30, which is the same as that described previously in connection with the first embodiment of the invention. As seen in FIGS. 7-9 and 13, first open end 32 of conduit 30 is configured and dimensioned to releasably connect in fluid communication with outlet 64 of pump 60. In the preferred embodiment, rim 66 is configured and dimensioned to releasably connect to first open end 32 of conduit 30. In order to connect first open end 32 of conduit 30 to outlet 64 of pump 60, cap 57 must be removed from the opening 58 in upper wall 56, as seen in FIG. 8. The rigid tube 36 of conduit 30 is inserted through opening 58, such that first open end 32 of conduit 30 is received within rim 66 adjacent to base wall 67. Rigid tube 36 is rotated to align notch 33 with outlet 64 of pump 60 to divert the water from outlet 64 into rigid tube 36. In order to prevent rotation of rigid tube 36, flag 35 is received within a slot 54 (see, FIG. 13).

In use, as shown in FIGS. 8-9, when cap 57 is removed from opening 58 in upper wall 56, conduit 30 is received in opening 58, and notch 33 of conduit 30 is connected with outlet 64 of pump 60, water is drawn into intake 62 of pump 60 via intake openings 53. The water is subsequently discharged from outlet 64 of pump 60 into the fluid channel of conduit 30 via notch 33, and subsequently discharged from said second end 34 of conduit 30. Therefore, the connection of conduit 30 to outlet 64 of pump 60 disrupts the normal flow of water out of outlet 64 of pump 60 into housing 52, and out of housing 52 via outlet opening 55. Instead the water is diverted into notch 33 and in turn into conduit 30.

The configuration shown in FIGS. 8, 9 and 13, allows conduit 30 to be utilized to drain water 103 from the aquarium 100 (FIG. 9) or as an alternate filter outlet within the aquarium (FIG. 8). Particularly, as seen in FIG. 8, when conduit 30 is connected to outlet 64 of pump 60, due to the flexible nature of flexible hose 38, the second end 34 of flexible hose 38 of conduit 30 can be positioned at any desired location within the aquarium 100, to discharge water from filter 50 to the selected remote location. Therefore, in this configuration in FIG. 8, second open end 34 of conduit 30 is an alternate filter outlet. This configuration of filter 50 in FIG. 8 is useful in increasing circulation within aquarium 100 since the filter outlet can be placed in different locations within the aquarium, remote from the pump outlet 64.

As shown in FIG. 9, in the same configuration of filter 50 as in FIG. 8, filter 50 can be utilized to direct water 103 away from aquarium 100 and drain the water from aquarium 100, into an external receptacle, such as, for example, bucket 104 or into a sink or drain (not shown). This allows water 103 to be removed from the aquarium 100 and later replaced with clean water.

While particular embodiments of the invention have been described, it is not intended that the invention be limited thereto, as it is intended that the invention be as broad in scope as the prior art will allow and that the specification be read likewise. It will therefore be appreciated by those skilled in the art that other modifications could be made thereto without departing from the spirit and scope of the invention.

What is claimed is:

1. An aquarium filter with water stream diversion system, comprising:
   an aquarium pump having an intake to receive water into said pump, an outlet to discharge water from said pump, and means to draw water into said intake and discharge water from said outlet; and
   a water stream diversion conduit comprising a first open end, a second open end opposite therefrom, and a fluid channel extending therebetween which establishes fluid communication between said first open end and said second open end thereof, wherein said first open end of said conduit is configured and dimensioned to alternately releasably connect in fluid communication with said intake of said pump and said outlet of said pump, wherein when said first open end of said conduit is connected to said outlet of said pump, water is diverted from said outlet of said pump into said fluid channel of said conduit via said first open end of said conduit and is discharged from said second open end of said conduit, and wherein when said first open end of said conduit is connected to said intake of said pump, water is drawn into said fluid channel of said conduit via said second open end of said conduit and is discharged from said first open end of said conduit into said intake of said pump.

2. The aquarium filter according to claim 1, wherein:
   said water stream diversion conduit comprises a rigid tube connected to a flexible hose.

3. The aquarium filter according to claim 2, further comprising:
   an intake tube having a first open end submersible in water to define an inlet, a second open end opposite therefrom connected to said intake of said pump to define an outlet, and a fluid channel extending therebetween which establishes fluid communication between said inlet and said outlet thereof, and wherein said intake tube defines an alternate inlet port therein which is configured and dimensioned to releasably connect to said first open end of said conduit; and
   a removable cap for sealing said alternate inlet port;
   wherein when said cap is disposed to seal said alternate inlet port of said intake tube, water is drawn into said fluid channel of said intake tube via said inlet of said intake tube and is discharged from said outlet of said intake tube into said intake of said pump, and wherein when said cap is removed from sealing said alternate inlet port of said intake tube and said first end of said conduit is connected to said alternate inlet port, water is drawn into said fluid channel of said conduit via said second open end of said conduit and is discharged from said first open end of said conduit into said intake of said pump.

4. The aquarium filter according to claim 3, wherein:
   said intake tube is generally U-shaped comprising a first generally upstanding leg extending upwardly from said intake of said pump, a second generally upstanding leg, and a transversely-disposed base leg connecting said first and said second upstanding legs, and wherein said alternate inlet port is disposed generally adjacent the connection of said first upstanding leg to said base leg and wherein at least a portion of said rigid tube of said water stream diversion conduit is configured and dimensioned to be removably received within said alternate inlet port and said first upstanding leg, when said cap is removed from sealing said alternate inlet port, to releasably connect said first open end of said conduit to said intake of said pump.

5. The aquarium filter according to claim 2, wherein:
   said outlet of said pump further comprises an upstanding rim and wherein at least a portion of said rigid tube of said water stream diversion conduit is configured and dimensioned to be releasably received within said upstanding rim to releasably connect said first open end of said conduit to said outlet of said pump.

6. The aquarium filter according to claim 5, wherein:
said first open end of said conduit further comprises a notch defined in said rigid tube and wherein when said conduit is received within said upstanding rim of said outlet of said pump, said rigid tube is rotatable to align said notch with said outlet of said pump, to divert water from said outlet of said pump into said conduit.

7. The aquarium filter according to claim 5, wherein:
said outlet of said pump further comprises a generally cylindrical sleeve disposed above and spaced apart from said upstanding rim of said outlet of said pump, and wherein said rigid tube is configured and dimensioned to be removably received within said sleeve and said upstanding rim.

8. The aquarium filter according to claim 1, wherein:
said pump further comprises means for filtering the water.

9. The aquarium filter according to claim 1, further comprising:
a gravel cleaning device connected to said second open end of said conduit.

10. The aquarium filter according to claim 1, further comprising:
a pump housing substantially enclosing said aquarium pump, comprising an upper wall defining an opening therein which is configured and dimensioned to removably receive said conduit therein, a front wall defining a plurality of intake openings therein, to permit water to be drawn into said housing, and an outlet opening, to permit water to exit said housing; and
a removable cap for closing said opening defined in said upper wall;
wherein when said cap is disposed to close said opening defined in said upper wall, water is drawn into said intake of said pump through said plurality of intake openings of said housing and is discharged from said outlet of said pump and subsequently from said housing via said outlet opening of said housing, and wherein when said cap is removed from closing said opening defined in said upper wall of said housing and said first open end of said conduit is received in said opening in said upper wall of said housing and connected with said outlet of said pump, water is drawn into said intake of said pump through said plurality of intake openings of said housing and is discharged from said outlet of said pump into said fluid channel of said conduit via said first open end of said conduit and subsequently discharged from said second end of said conduit.

11. A method of using an aquarium filter having a water stream diversion system, comprising the steps of:
providing an aquarium containing water therein;
providing an aquarium pump having an intake to receive water into said pump, an outlet to discharge water from said pump, and means to draw water into said intake and discharge water from said outlet;
providing a water stream diversion conduit comprising a first open end, a second open end opposite therefrom, and a fluid channel extending therebetween which establishes fluid communication between said first open end and said second open end thereof, wherein said first open end of said conduit is configured and dimensioned to alternately releasably connect in fluid communication with said intake of said pump and said outlet of said pump;
connecting said first open end of said conduit to a member selected from the group consisting of said intake of said pump and said outlet of said pump, wherein when said first open end of said conduit is connected to said outlet of said pump, water is diverted from said outlet of said pump into said fluid channel of said conduit via said first open end of said conduit and is discharged from said second open end of said conduit, and wherein when said first open end of said conduit is connected to said intake of said pump, water is drawn into said fluid channel of said conduit via said second open end of said conduit and discharged from said first open end of said conduit into said intake of said pump.

12. The method according to claim 11, further comprising:
connecting said first open end of said conduit to said outlet of said pump;
positioning said second open end of said conduit within said aquarium; and
diverting water from said outlet of said pump into said fluid channel of said conduit via said first open end of said conduit, and discharging water from said second open end of said conduit into said aquarium, for an alternate filter outlet.

13. The method according to claim 11, further comprising:
connecting said first open end of said conduit to said outlet of said pump;
positioning said second open end of said conduit externally of said aquarium and;
diverting water from said outlet of said pump into said fluid channel of said conduit via said first open end of said conduit, and discharging water from said second open end of said conduit externally of said aquarium, to drain water from said aquarium.

14. The method according to claim 11, further comprising:
connecting said first open end of said conduit to said inlet of said pump;
positioning said second open end of said conduit within said aquarium; and drawing water into said fluid channel of said conduit via said second open end of said conduit and discharging water from said first open end of said conduit into said intake of said pump, for an alternate filter intake.

15. The method according to claim 11, further comprising:
connecting said first open end of said conduit to said inlet of said pump;
providing an external source of water;
connecting said second open end of said conduit in fluid communication with said external source of water; and
drawing water into said fluid channel of said conduit via said second open end of said conduit from said external source of water and discharging water from said first open end of said conduit into said intake of said pump, to fill said aquarium.

16. The method according to claim 11, wherein:
said pump further comprises an intake tube having a first open end submersible in water to define an inlet, a second open end opposite therefrom connected to said intake of said pump to define an outlet, and a fluid channel extending therebetween which establishes fluid communication between said inlet and said outlet thereof, and wherein said intake tube defines an alternate inlet port therein which is configured and dimensioned to releasably connect to said first open end of said conduit; and a removable cap for sealing said alternate inlet port; wherein when said cap is disposed to seal said alternate inlet port of said intake tube, water is drawn into said fluid channel of said intake tube via said inlet of said intake tube and is discharged from said outlet of said intake tube into said intake of said pump;

removing said cap from sealing said alternate inlet port of said intake tube;

connecting said first open end of said conduit to said alternate inlet port; and drawing water into said fluid channel of said conduit via said second open end of said conduit and discharging water from said first open end of said conduit into said intake of said pump.

17. The method according to claim 16, wherein:

said intake tube is generally U-shaped comprising a first generally upstanding leg extending upwardly from said intake of said pump, a second generally upstanding leg, and a transversely-disposed base leg connecting said first and said second upstanding legs, and wherein said alternate inlet port is disposed generally adjacent the connection of said first upstanding leg to said base leg and wherein said method further comprises removing said cap from sealing said alternate inlet port, inserting said conduit into said alternate inlet port and said first upstanding leg, and connecting said first open end of said conduit to said intake of said pump.

18. The method according to claim 11, wherein:

said outlet of said pump further comprises an upstanding rim which is configured and dimensioned to releasably receive said first open end of said conduit therein.

19. The method according to claim 11, wherein:

said pump further comprises means for filtering the water; and said method further comprises the step of filtering water with said means for filtering.

20. The method according to claim 11, further comprising:

providing a gravel cleaning device connected to said second open end of said conduit;

connecting said first open end of said conduit to said inlet of said pump;

positioning said second open end of said conduit connected to said gravel cleaning device within said aquarium; and drawing water into said gravel cleaning device and subsequently into said fluid channel of said conduit via said second open end of said conduit and discharging water from said first open end of said conduit into said intake of said pump, to clean gravel using said gravel cleaning device.

21. The method according to claim 11, wherein:

said water stream diversion conduit comprises a rigid tube connected to a flexible hose.

22. The method according to claim 11, further comprising:

a pump housing substantially enclosing said aquarium pump, comprising an upper wall defining an opening therein which is configured and dimensioned to removably receive said conduit therein, a front wall defining a plurality of intake openings therein, to permit water to be drawn into said housing, and an outlet opening, to permit water to exit said housing; and a removable cap for closing said opening defined in said upper wall;

wherein when said cap is disposed to close said opening defined in said upper wall, water is drawn into said intake of said pump through said plurality of intake openings of said housing and is discharged from said outlet of said pump and subsequently from said housing via said outlet opening of said housing;

and wherein said method further comprises removing said cap from closing said opening defined in said upper wall of said housing;

inserting said first open end of said conduit through said opening in said upper wall of said housing;

connecting said first open end of said conduit with said outlet of said pump; and drawing water into said intake of said pump through said plurality of intake openings of said housing and discharging water from said outlet of said pump into said fluid channel of said conduit via said first open end of said conduit and subsequently discharging the water from said second end of said conduit.

* * * * *